United States Patent [19]

Cuisia et al.

[11] 4,048,066
[45] Sept. 13, 1977

[54] METHOD OF INHIBITING SCALE
[75] Inventors: Dionisio Guerrero Cuisia, Chicago; Chih Ming Hwa, Palatine, both of Ill.
[73] Assignee: Chemed Corporation, Cincinnati, Ohio
[21] Appl. No.: 742,521
[22] Filed: Nov. 17, 1976
[51] Int. Cl.$^2$ .............................................. C02B 5/06
[52] U.S. Cl. ..................................... 210/58; 252/180
[58] Field of Search ................... 210/58; 252/180, 181
[56] References Cited
U.S. PATENT DOCUMENTS

| | | | |
|---|---|---|---|
| 2,327,302 | 8/1943 | Dittmar | 252/180 |
| 2,729,557 | 1/1956 | Booth et al. | 210/58 |
| 3,682,224 | 8/1972 | Bleyle | 210/58 |
| 3,928,196 | 12/1975 | Persinski | 210/58 |

Primary Examiner—Thomas G. Wyse
Attorney, Agent, or Firm—Charles L. Harness

[57] ABSTRACT

The invention disclosed relates to a method for using a new improved composition for inhibiting or preventing accumulation of scale or the like on heating surfaces in an aqueous system. The present composition includes (A) copolymers of styrene sulfonic acid with acrylic or methacrylic acid, and their water-soluble salts; or (B) mixture of polystyrene sulfonic acid with polyacrylic or polymethacrylic acid, and their water-soluble salts.

9 Claims, No Drawings

METHOD OF INHIBITING SCALE

This invention relates to a method for using a new improved composition for preventing accumulation of scale in aqueous systems. More specifically, the present invention provides a method wherein only relatively small quantities of the new improved composition are used for effectively preventing formation of scale and sludge deposits in steam generating boilers.

It is well known in the art that formation of scale and sludge deposits on heating surfaces is one of the most serious problems encountered in boiler operations. External softening partially removes from the boiler feedwater some scale-forming substances. To combat scale-forming tendency of entrained impurities such as calcium and magnesium salts, and iron, internal chemical treatment is applied in boiler water in most industrial boilers. The chemical treatment of boiler water generally requires the combined use of a precipitating agent and a sludge conditioner to maintain the boiler sludge in a fluid form for effective removal. The precipitating chemicals commonly employed for calcium salts are soda ash and the sodium phosphates, e.g., disodium phosphate, trisodium phosphate, and sodium metaphosphate. Magnesium is precipitated by the alkalinity of the boiler water as magnesium hydroxide. The precipitate or sludge, which is made non-sticky and easily manageable by the addition of a sludge conditioner, is periodically removed from the boiler through the blowdown.

Prior to the present invention, a number of materials such as tannin, lignins, starches, polyacrylates, polymethacrylates, and sodium carboxymethylcellulose were used as sludge conditioners. However, their use has not been completely satisfactory. Accordingly, by practice of the present invention, an improved sludge conditioning composition has been found, which is capable of preventing and controlling scale from a steam generating boiler. We have found that (A) water-soluble copolymers of styrene sulfonic acid with another polymerizable monoethylenic compound, and their water-soluble salts; or (B) a physical mixture of polystyrene sulfonic acid with an acrylic polymer whose polymer chain structure comprises units having the following formula:

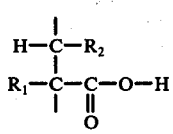

wherein $R_1$ is of the class consisting of H and $CH_3$ and $R_2$ is of the class consisting of H and COOH, and their water-soluble salts, are excellent sludge conditioners and show synergistic effect in preventing and controlling scale in steam generating boilers.

Generally stated, the method of this invention for inhibiting or preventing accumulation of scale or the like in aqueous systems, includes adding to water flowing through the systems from about 0.01 to about 500 parts per million (ppm) and preferably about 0.2 to about 50 parts per million of composition (A) or (B) above.

Compositions used for treatment of aqueous systems may contain from 1 to 70 percent and preferably from 1 to 10 percent of the combinations disclosed by this invention. These solutions can be made by adding the ingredients to water in any order. These aqueous feed solutions are stable and can be stored prior to use. The compositions may be sold and used in the form of a dry powder or briquette or in the form of an aqueous solution containing from 50 to 99 percent by weight of water.

Compositions used in the practice of the present invention may also include other ingredients customarily employed in boiler water or cooling water treatments such as alkalies, lignin derivatives, biocides, corrosion inhibitors, etc. The point in the systems at which the treatment mixtures are added is not critical; however, it is customary to add them to the makeup or fresh water lines through which water enters the system.

The invention is further illustrated by the following specific but non-limiting examples, wherein all parts are given by weight unless otherwise indicated.

EXAMPLE 1

This example demonstrates the system used for determining the reduction in scaling rates obtained with the compositions of this invention.

Scale inhibiting evaluation was carried out in a small laboratory boiler having three removable electric heating tube surfaces. At the completion of a test, the heating tubes were removed individually from the boiler, the scale or deposit present on 6 inches of the central length of each tube was removed, by scraping, collected in a tared vial and weighed. When scaling tests are run using given feedwater and scale inhibitor present in the boiler water and with varying dosages of a given scale inhibitor, data is obtained as to how well the given reagent or reagents prevent scale deposition and also a comparison of scale inhibiting effectiveness of the subject reagents.

The small laboratory boiler used has been described previously in the proceedings of the Fifteenth Annual Water Conference, Engineers Society of Western Pennsylvania, pages 87–102 (1954). Boiler feedwater was prepared by diluting Lake Zurich, Illinois, tap water with distilled water to 40 ppm total hardness as $CaCO_3$, followed by adjustment to a 6 to 1 elemental calcium to magnesium ratio using calcium chloride. The boiler feedwater was fed to the boiler together with chemical treatment solutions containing sodium sulfate, sodium sulfite, sodium hydroxide, sodium chloride, treatment agents consisting of phosphate and scale inhibitors except in blank runs, in a ratio of 3 volumes of feedwater to 1 volume of chemical treatment solution, giving a feedwater total hardness of 30 ppm as $CaCO_3$.

All scaling tests, whether scale inhibitor was present or absent (blank), were carried out in fixed manner as described following: Boiler blowdown was adjusted to 10% of the boiler feedwater, giving approximately 10 concentrations of the boiler water salines. Using the feedwater described, the composition of the chemical treatment solution was adjusted to give a boiler water (after the 10 concentrations) of the following composition:

TABLE 1

| Ingredient | Taken as | Concentration (PPM) |
|---|---|---|
| Sodium Hydroxide | NaOH | 258 |
| Sodium Carbonate | $Na_2CO_3$ | 120 |
| Sodium Chloride | NaCl | 681 |
| Sodium Sulfite | $Na_2SO_3$ | 50 |
| Sodium Sulfate | $Na_2SO_4$ | 819 |
| Silica | $SiO_2$ | less than 1 |
| Iron | Fe | less than 1 |

TABLE 1-continued

| Ingredient | Taken as | Concentration (PPM) |
|---|---|---|
| Phosphate | PO$_4$ | 10–20 |

All scaling tests were run for 43 hours each at a boiler pressure of 335 to 400 psig.

EXAMPLES 2–19

Composition A, Copolymers

Using the procedure of Example 1, a series of runs were performed whereby the scale inhibiting properties of the copolymers of Composition A are illustrated.

TABLE II

| Example No. | Additive | Dosage, ppm | Scaling Rate gm/ft$^2$/hr. | Scale Reduction % |
|---|---|---|---|---|
| 2 | None (Blank) | — | 0.230 | 0 |
| 3 | Sodium acrylate-sodium styrene sulfonate copolymer (1:3 by wt.) having a mol. wt. of 4,000 | 0.25 | 0.1817 | 21.0 |
| 4 |  | 0.5 | 0.078 | 66.1 |
| 5 |  | 1 | 0.000 | 100.0 |
| 6 |  | 2 | 0.000 | 100.0 |
| 7. | Sodium acrylate-sodium styrene sulfonate copolymer (1:2 by wt.) having a mol. wt. of 4,000 | 2 | 0.0015 | 99.4 |
| 8 | Sodium acrylate-sodium styrene sulfonate copolymer (1:1 by wt.) having a mol. wt. of 4,000 | 2 | 0.0034 | 98.5 |
| 9 | Sodium methacrylate-sodium styrene sulfonate copolymer (1:1 by wt.) having a mol. wt. of approx. 5,000 | 2 | 0.0113 | 95.0 |
| 10 | Sodium polystyrene sulfonate having a mol. wt. of 34,000 | 2 | 0.233 | None |
| 11 | Sodium polystyrene sulfonate having a mol. wt. of 70,000 | 2 | 0.231 | None |

It is apparent that the copolymers of sodium acrylate and sodium styrene sulfonate possess excellent scale inhibitive activity while the homopolymers of sodium styrene sulfonate are relatively ineffective.

The following copolymers according to this invention show similar unexpected scale reductions when tested by the procedure described above.

| Example No. | Copolymers |
|---|---|
| 12 | Acrylic acid-styrene sulfonic acid copolymer (1:1 by wt.) having a molecular weight of 150,000 |
| 13 | Potassium methacrylate-sodium styrene sulfonate copolymer (1:5 by wt.) having a molecular weight of 250,000 |
| 14 | Methacrylic acid-styrene sulfonic acid copolymer (10:1 by wt.) having a molecular weight of 2,500 |
| 15 | Methyl vinyl ether-sodium styrene sulfonate copolymer (1:4 by wt.) having a molecular weight of 3,500 |
| 16 | Vinyl alcohol-ammonium styrene sulfonate copolymer (1:9 by wt.) having a molecular weight of 400,000 |
| 17 | Maleic acid-sodium styrene sulfonate copolymer (1:3 by wt.) having a molecular weight of 4,000 |
| 18 | Itaconic acid-styrene sulfonic acid copolymer (1:2 by wt.) having a molecular weight of 50,000 |
| 19 | Sodium methacrylate-sodium styrene sulfonate copolymer (8:1 by wt.) having a molecular weight of 1,500,000 |

EXAMPLES 20–41

Composition B, Mixture of Polymers

The boiler water sludge conditioning properties of the synergistic combinations of styrene sulfonate polymer with acrylic polymer are illustrated by the following non-limiting examples.

| Example No. | Additive | Dosage, ppm | Scaling Rate gm/ft$^2$/hr. | Scale Reduction % |
|---|---|---|---|---|
| 20 | None (Blank) | — | 0.230 | 0 |
| 21 | Sodium polymethacrylate having a mol. wt. of 4,500 (I) | 1 | 0.151 | 34.4 |
| 22 |  | 2 | 0.033 | 85.7 |
| 23 | Sodium polyacrylate having a mol. wt. of 95,000 (II) | 2 | 0.131 | 43.0 |
| 24 | Sodium polystyrene sulfonate having a mol. wt. of 70,000 (III) | 1 | 0.252 | None |
| 25 |  | 2 | 0.231 | None |
| 26 | Sodium polystyrene sulfonate having a mol. wt. of 500,000 (IV) | 2 | 0.148 | 35.7 |
| 27 | I + III (1:1 by wt.) | 1 | 0.0238 | 89.7 |
| 28 | I + III (1:1 by wt.) | 2 | 0.001 | 99.6 |
| 29 | I + III (4:1 by wt.) | 1 | 0.0082 | 96.4 |
| 30 | I + III (4:1 by wt.) | 2 | 0.000 | 100.0 |
| 31 | I + III (5:1 by wt.) | 2 | 0.0023 | 99.0 |
| 32 | I + III (10:1 by wt.) | 2 | 0.0091 | 96.0 |
| 33 | I + IV (1:1 by wt.) | 2 | 0.0098 | 95.7 |
| 34 | II + III (1:1 by wt.) | 2 | 0.106 | 54.0 |
| 35 | I + Sodium acrylate-sodium |  |  |  |

-continued

| Example No. | Additive | Dosage, ppm | Scaling Rate gm/ft²/hr. | Scale Reduction % |
|---|---|---|---|---|
|  | styrene sulfonate copolymer (1:3 by wt.) having a mol. wt. of 4,000 (V) (1:1 by wt.) | 2 | 0.000 | 100.0 |
| 36 | I + V (2:1 by wt.) | 2 | 0.006 | 97.4 |
| 37 | Polymaleic acid (VI) | 2 | 0.174 | 17.5 |
| 38 | VI+ III (1:1 by wt.) | 2 | 0.006 | 97.4 |

As shown in Table III, the synergistic effect of acrylic polymer and styrene sulfonate polymer in preventing scale is evident.

The following mixtures according to this invention show similar unexpected scale reductions when tested by the procedure of Example 1.

| Example No. | Polymer Mixtures |
|---|---|
| 39 | Potassium polymethacrylate having a mol. wt. of 10,000 40%, potassium polystyrene sulfonate having a mol. wt. of 700,000 60% |
| 40 | Sodium polyacrylate having a mol. wt. of 5,000 80%, sodium acrylate-sodium styrene sulfonate copolymer (1:3 by wt.) having a mol. wt. of 10,000 20% |
| 41 | Polyacrylic acid having a mol. wt. of 4,000 85%, maleic acid-sodium styrene sulfonate copolymer (1:1 by wt.) having a molecular weight of 8,000 15% |

Some Preferred Embodiments

Composition A — Copolymer

The amount of styrene sulfonic acid in the copolymer chain is preferably about 2 to 98 wt.%, and even more preferably, about 50 to 80 wt.%. The molecular weight of the copolymer is preferably in the range of about 800 to 7,000,000, and even more preferably about 1,500 to 500,000.

Composition B — Polymer Mixture

The amount of polystyrene sulfonic acid (or salt) in the mixture is preferably about 1 to 90 wt.%, more preferably, about 5 to 50 wt.%. The molecular weight of the styrene sulfonate polymer is preferably about 800 to 7,000,000, and even more preferably about 1,500 to 500,000. The molecular weight of the acrylic polymer is preferably about 800 to 5,000,000, and even more preferably about 2,000 to 200,000.

Obviously, many modifications and variations of the invention as hereinbefore set forth can be made without departing from the essence and scope thereof, and only such limitations should be applied as are indicated in the appended claims.

What is claimed is:

1. A method for inhibiting deposits of scale, sludge, and other foulants in aqueous systems, said method consisting essentially of adding to the said systems 0.01 to 500 ppm of a composition selected from the group consisting of (A) water-soluble copolymers of styrene sulfonic acid with another polymerizable monoethylenic compound, and their water-soluble salts or (B) mixture of polystyrene sulfonic acid with an acrylic polymer whose polymer chain structure comprises units having the following formula:

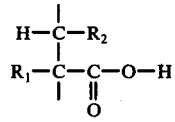

wherein $R_1$ is selected from the group consisting of H or $CH_3$ and $R_2$ is selected from the group consisting of H or COOH, and their water-soluble salts.

2. Method according to claim 1 in which the composition is a copolymer of styrene sulfonic acid with acrylic or methacrylic acid, including their water-soluble salts.

3. Method according to claim 1 in which the composition is a mixture of polystyrene sulfonic acid with polyacrylic or polymethacrylic acid, and their water-soluble salts.

4. Method according to claim 2 in which the styrene sulfonic acid moiety is about 2 to 98% by weight of the copolymer.

5. Method according to claim 4 in which the copolymer has a molecular weight in the range of about 800 to 7,000,000.

6. Method according to claim 4 in which the copolymer is in the form of the sodium salt.

7. Method according to claim 3 in which the polystyrene sulfonic acid portion is about 1 to 90% by weight of the mixture.

8. Method according to claim 7 in which the polystyrene sulfonic acid portion has a molecular weight of about 800 to 7,000,000 and the acrylic polymer portion has a molecular weight of about 800 to 5,000,000.

9. Method according to claim 8 in which the polymers are in the form of their sodium salts.

* * * * *

Disclaimer 4,048,066.—*Dionisio Guerrero Cuisia, Chicago* and *Chih Ming Hwa*, Palatine, Ill. METHOD AND COMPOSITION OF INHIBITING SCALE. Patent dated Sept. 13, 1977. Disclaimer filed August 14, 1980, by the assignee, *Chemed Corporation*.

Hereby enters this disclaimer to claim 1 of said patent.

[*Official Gazette March 24, 1981.*]